(No Model.) 3 Sheets—Sheet 1.

D. C. RIPLEY.
MANUFACTURE OF GLASSWARE.

No. 458,189. Patented Aug. 25, 1891.

WITNESSES.
Thomas W. Bakewell
O. M. Clarke

INVENTOR.
Daniel C. Ripley (No Model.) 3 Sheets—Sheet 2.

D. C. RIPLEY.
MANUFACTURE OF GLASSWARE.

No. 458,189. Patented Aug. 25, 1891.

WITNESSES.
Thomas W. Bakewell
C. M. Clarke

INVENTOR.
Daniel C. Ripley (No Model.) 3 Sheets—Sheet 3.
D. C. RIPLEY.
MANUFACTURE OF GLASSWARE.

No. 458,189. Patented Aug. 25, 1891.

WITNESSES.
Thomas W. Bakewell
C. M. Clarke

INVENTOR.
Daniel C. Ripley.

UNITED STATES PATENT OFFICE.

DANIEL C. RIPLEY, OF PITTSBURG, PENNSYLVANIA.

MANUFACTURE OF GLASSWARE.

SPECIFICATION forming part of Letters Patent No. 458,189, dated August 25, 1891.

Application filed May 16, 1890. Serial No. 352,022. (No model.)

*To all whom it may concern:*

Be it known that I, DANIEL C. RIPLEY, of Pittsburg, in the county of Allegheny and State of Pennsylvania, have invented a new and useful Improvement in the Manufacture of Glassware, of which the following is a full, clear, and exact description, reference being had to the accompanying drawings, forming part of this specification, in which—

Figure 1:
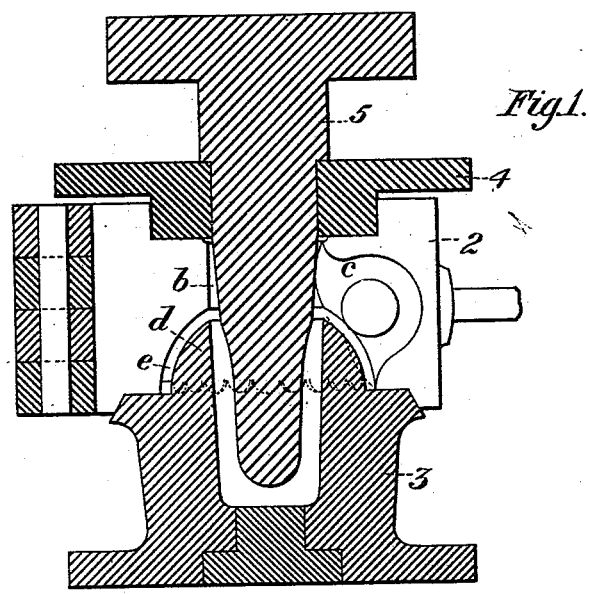
Figure 6:
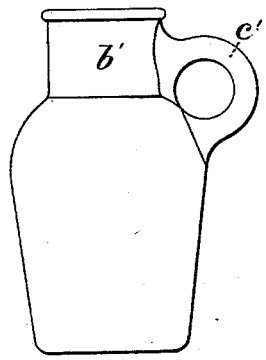
Figure 7:
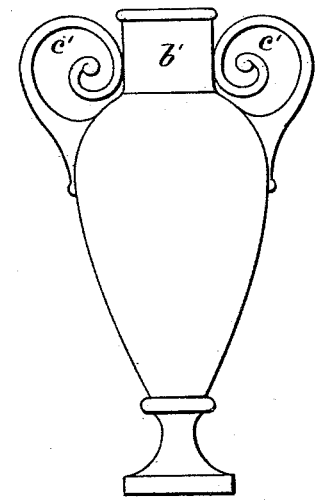
Figure 5:
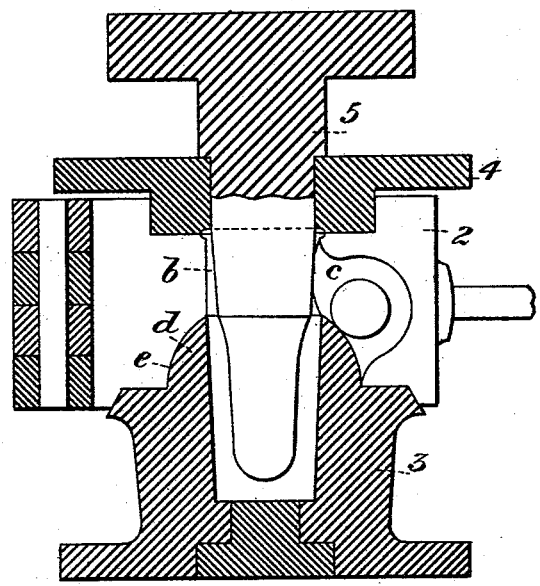
Figure 1A:
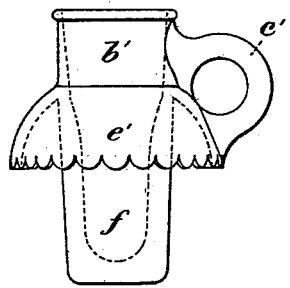
Figure 4:
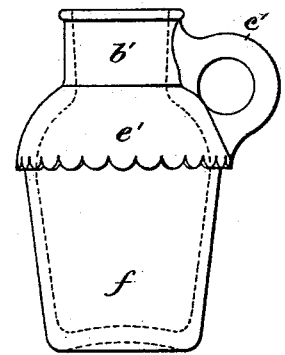
Figure 2:
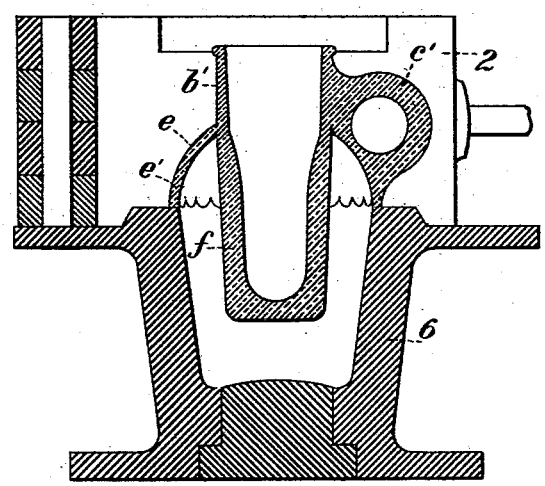
Figure 3:
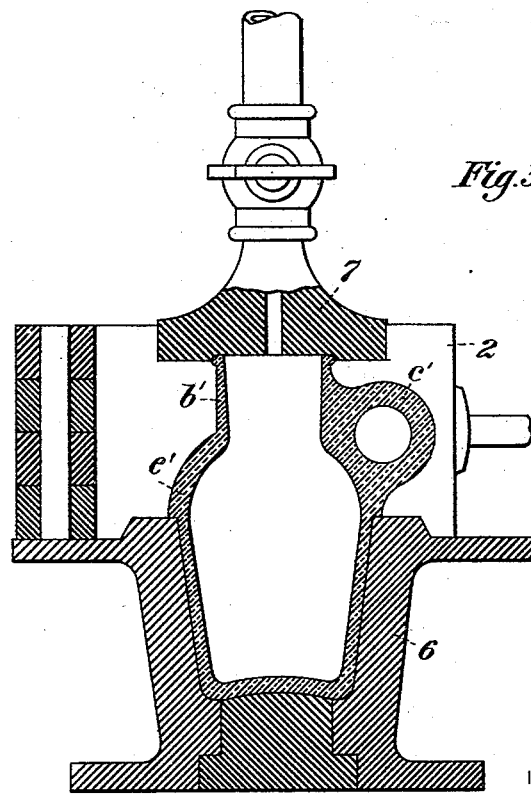

Figure 1 is a vertical sectional view of a glass-mold illustrating the first step of my method. Fig. 1ª is a side view of the blank as produced by the mold shown in Fig. 1. Fig. 2 is a sectional view of apparatus, illustrating the second step. Fig. 3 is a similar view illustrating the final step of the manufacture. Fig. 4 is a side elevation of the article produced by the mold shown in Figs. 1, 2, and 3. Fig. 5 is a sectional view of a modified form of apparatus. Figs. 6 and 7 are views of articles produced by molds of the type shown in Fig. 5.

My invention relates to an improvement in that branch of the art of glass manufacture in which a glass article is made by a combined pressing and blowing operation, the blank being first pressed with a portion thereof in the ultimate shape desired for the finished article, and the remainder of the blank being afterward expanded by blowing. The advantages of such mode of manufacture are that the portion of the article which is pressed is reduced at once thereby to its finished form, and the further operations of reheating, shaping, and finishing it are dispensed with.

The improvement which I have made consists in a method of manufacture in which the pressed portion includes one or more projections, handles, or skirts, one end of which is made integral with the pressed portion of the blank, while the other end is free and is on the outer side of that portion of the blank which is to be expanded by blowing, so that on so expanding the blank it will blow out against and adhere to such projection, handle, or skirt. This improvement is capable of varied application in the manufacture of glassware. It enables many beautiful effects to be produced which were not hitherto possible, and cheapens to a considerable degree the cost of manufacture.

Referring now to the drawings, the mold shown in Fig. 1 consists of a sectional jointed part 2, and a lower base portion 3, which may be made of a single piece, though, if desired, it may be made of jointed sections, as will be understood. The cavity of the portion 2 of the mold is shaped to conform to the upper part of the finished article having a neck-cavity $b$, and a branch cavity $c$, communicating at one end with the cavity $b$, and open at the other end and of proper shape and size to form a glass handle.

4 is the usual ring, and 5 is a plunger adapted to enter the cavity $b$ and to press the blank. At the lower end of the cavity $b$ the mold-section 2 is formed with an enlarged cavity $e$, which forms a continuation or a part of the branch cavity $c$, and within which fits an annular shoulder $d$ at the end of the mold portion 3. The cavity $e$ thus left open between the shoulder $d$ and the mold portion 2 is of annular form, as shown in Fig. 1.

The operation is as follows: The parts of the mold are fitted together, as shown in Fig. 1, a gathering of molten glass is placed in the mold-cavity, and by depressing the plunger I form a glass blank of the shape shown in Fig. 1ª. In the blank thus formed the neck $b'$ and handle $c'$ are completed in form, the lower part $f$ is unfinished, being relatively smaller than the corresponding part of the completed glass article, and there is a surrounding skirt $e'$ attached to the neck at one end and free at the other end. This skirt may be provided with any suitable pattern by proper configuration of the mold of Fig. 1. This is preferably done by forming a pattern on the shoulder $d$, which is reproduced on the inner side of the skirt, and the lower edge of the skirt may be indented, scalloped, or otherwise figured by proper shaping of the base of the shoulder $d$. The plunger 5 and ring 4 are now withdrawn and the mold portion 2 containing the glass-blank is lifted and placed over a mold 6, Fig. 2, whose cavity is of the shape of the lower portion of the body of the finished article, the cavity for the upper portion of the body being constituted by the cavity $e$ containing the skirt $e'$. The position of the parts of the mold and of the glass-blank therein is shown in Fig. 2, the neck of the blank being inclosed by the mold portion 2 in the same manner as shown in Fig. 1, the body of the blank depending within the cavity 6, and the skirt $e'$, with the lower end of the handle attached thereto, being within the cavity $e$ around the part $f$ of the blank. A blow-pipe 7 is now set over the cavity of the mold part 2, and on the admission of compressed air through said blow-pipe the body $f$ of the glass-blank is expanded within the mold-cavities 6 and $e$ against the sides of the cavity 6 and against the inner sides of the skirt $e'$, to which the glass adheres and welds, as shown in Fig. 3. The article is now complete and may be removed from the mold, and as its neck has been made by pressing it is in finished condition and needs no subsequent reheating or polishing. If the inner side of the skirt $e'$ has been first provided with a pattern in the manner suggested above, this pattern will be apparent on the finished article, and as it is inclosed by glass, which on the outside of the skirt and on the inside of the glass article is of smooth surface, the pattern cannot collect dirt, and does not interfere with the washing or cleaning of the glass.

The apparatus may be used in the manufacture of articles of many different styles and shapes.

It will be understood by those skilled in the art that the advantages of my invention in so far as relates to the plating of the glass article with an outside skirt may be had independently of the attachment of the handle. In order to adapt the apparatus for this purpose the mold part 2 may be formed without the handle-cavity, but otherwise it may be the same; also, the advantages resulting from my peculiar mode of attachment of the handle may be secured in an article formed without the skirt. These modes of manufacture are within the scope of my invention, which consists, broadly, in pressing a glass-blank with a finished portion, an unfinished portion, and a projection attached to the finished portion and extending opposite to and outside of the unfinished portion, and then blowing and expanding the glass-blank into contact with said projection. Thus, in Fig. 5, I show a mold adapted to make a blank having a finished neck and handle and an unfinished body portion. This mold may be substantially the same as the mold of Fig. 1, except that the shoulder $d$ is adapted to close entirely the cavity $e$, so that no skirt shall be formed on the blank.

The apparatus for the second step of the manufacture may be substantially the same as that shown in Fig. 2. When the mold portion 2 is placed on the part 3, the free end of the handle $c'$ within the cavity $c$ is flush with the wall of the cavity of the mold part 6, and when the body of the article is blown it expands into contact with the end of the handle, making an article of the shape shown in Fig. 6.

In Fig. 7 I show a two-handled article produced by a mold, which is provided with two handle-cavities $c$, one on each side.

The advantages in saving of labor resulting from this mode of applying a handle or handles to glass articles will be understood by those skilled in the art.

As the invention is described in the foregoing specification, the article is completed without necessity for reheating the blank in any part of its manufacture. This is of material advantage; but I do not exclude from the scope of the invention a method in which the blank is reheated before the blowing operation.

I claim—

1. In the manufacture of glassware, the method hereinbefore described, which consists in pressing a glass-blank with a hollow body portion and an integral portion projecting on the outer side of the hollow portion and then blowing the hollow body portion and expanding it into contact with the projecting portion, substantially as and for the purposes described.

2. In the manufacture of glassware, the method hereinbefore described, which consists in pressing a glass-blank with a neck of finished shape, a hollow body portion, and a portion one end of which is attached to the neck, while the other end is free and projects on the outer side of the body portion, and blowing the hollow body portion in a mold and expanding it into contact with the projecting portion, substantially as and for the purposes described.

3. In the manufacture of glassware, the method hereinbefore described, which consists in pressing a glass-blank with an encircling skirt and an unfinished integral hollow portion within the skirt and then blowing and expanding said unfinished hollow portion into contact with the skirt, substantially as and for the purposes described.

4. In apparatus for the manufacture of glassware, the combination of a mold part 2, having a neck-cavity, a second branch cavity communicating at one end with the neck-cavity and open at the other end, and a separable removable base part 3, which is at the end of the branch cavity and closes the same and which has a cavity forming a continuation of the neck-cavity, substantially as and for the purposes described.

In testimony whereof I have hereunto set my hand this 12th day of May, A. D. 1890.

DANIEL C. RIPLEY.

Witnesses:
W. B. CORWIN,
H. M. CORWIN.